United States Patent
Mauermann (10) Patent No.: US 12,472,598 B2
(45) Date of Patent: Nov. 18, 2025

(54) CUTTING MACHINE WITH A TEMPERATURE COMPENSATION

(71) Applicant: ZÜND SYSTEMTECHNIK AG, Altstätten (CH)

(72) Inventor: Christian Mauermann, Rohrschacherberg (CH)

(73) Assignee: ZÜND SYSTEMTECHNIK AG, Altstätten (CH)

( * ) Notice: Subject to any disclaimer, the term of this patent is extended or adjusted under 35 U.S.C. 154(b) by 358 days.

(21) Appl. No.: 17/823,483

(22) Filed: Aug. 30, 2022

(65) Prior Publication Data
US 2023/0065812 A1 Mar. 2, 2023

(30) Foreign Application Priority Data
Aug. 31, 2021 (EP) ................................ 21194030

(51) Int. Cl.
B23Q 11/00 (2006.01)
B23Q 15/18 (2006.01)
B26D 5/00 (2006.01)

(52) U.S. Cl.
CPC .......... *B23Q 11/0007* (2013.01); *B23Q 15/18* (2013.01); *B26D 5/005* (2013.01)

(58) Field of Classification Search
None
See application file for complete search history.

(56) References Cited

U.S. PATENT DOCUMENTS

| 5,353,768 | A * | 10/1994 | Messih | F02D 41/045 123/492 |
| 6,167,634 | B1 * | 1/2001 | Pahk | G01B 5/0014 33/503 |
| 6,178,389 | B1 * | 1/2001 | Sola | G01B 21/04 702/167 |
| 6,519,860 | B1 * | 2/2003 | Bieg | B23H 7/26 73/1.79 |
| 6,720,567 | B2 * | 4/2004 | Fordahl | B23K 26/046 250/559.29 |
| 6,748,790 | B2 * | 6/2004 | Abbe | G01B 21/042 73/1.79 |

(Continued)

FOREIGN PATENT DOCUMENTS

| CN | 105807714 | A | * | 7/2016 | |
| CN | 213126987 | U | * | 5/2021 | G01K 13/00 |

(Continued)

*Primary Examiner* — Jason Lin
(74) *Attorney, Agent, or Firm* — Muncy, Geissler, Olds & Lowe, P.C.

(57) ABSTRACT

Disclosed is a cutting machine and a method for controlling a cutting machine with a retrieval of a cutting job for processing an object on a working surface of the cutting machine with a cutting device, a defining of a cutting path based on the cutting job, a continuous retrieval of position data, and a guidance based on the position data, of the cutting device along the cutting path for processing, in particular cutting, the object, characterized by a temperature compensation functionality with continuous retrieval of temperature data from one or more temperature sensors, and using the temperature data for defining the cutting path and/or for adjusting the cutting path.

8 Claims, 4 Drawing Sheets

(56) References Cited

U.S. PATENT DOCUMENTS

| | | | |
|---|---|---|---|
| 6,973,734 B2 * | 12/2005 | Raab | B25J 17/025 |
| | | | 33/503 |
| 2002/0133264 A1 * | 9/2002 | Maiteh | G05B 19/4097 |
| | | | 700/86 |
| 2005/0166413 A1 * | 8/2005 | Crampton | G01B 11/03 |
| | | | 33/503 |
| 2010/0152881 A1 * | 6/2010 | Ou | G05B 19/404 |
| | | | 700/174 |
| 2012/0197427 A1 * | 8/2012 | Gallucci | B26D 5/005 |
| | | | 382/141 |
| 2013/0089642 A1 * | 4/2013 | Lipson | B33Y 10/00 |
| | | | 426/115 |
| 2017/0185063 A1 * | 6/2017 | Suzuki | B23Q 15/04 |
| 2018/0364677 A1 * | 12/2018 | Jalluri | G01K 1/14 |
| 2019/0001656 A1 * | 1/2019 | Susnjara | B33Y 40/00 |

FOREIGN PATENT DOCUMENTS

| | | | |
|---|---|---|---|
| CZ | 303135 B6 * | 4/2012 | |
| DE | 102004047525 A1 | 4/2006 | |
| DE | 102018206488 A1 * | 10/2019 | |
| EP | 1385674 B1 | 6/2008 | |
| EP | 2488333 B1 | 3/2014 | |
| EP | 3425329 A1 | 1/2019 | |
| EP | 3437794 A2 | 2/2019 | |
| EP | 3689537 A1 | 8/2020 | |
| KR | 20130069777 A * | 6/2013 | |
| WO | 2011045729 A1 | 4/2011 | |
| WO | 2018184677 A1 | 10/2018 | |

\* cited by examiner

CUTTING MACHINE WITH A TEMPERATURE COMPENSATION

The present application claims priority to European Patent application 21194030.9 filed Aug. 31, 2021 which is herein incorporated by reference in its entirety.

The invention relates to a cutting machine for cutting objects, wherein the cutting machine has a gantry travel system with a linear feed axis as the transverse axis of the gantry travel system, and to a method for controlling such a cutting machine. The cutting machine according to the invention has temperature sensors on the transverse axis, the measured values of which are used to perform a temperature compensation functionality.

Generic cutting machines are described, for example, in the documents EP 1 385 674 B1 and EP 2 488 333 B1. Such a machine has a working surface designed to receive at least one object, a working group movably arranged on a crossbeam above the working surface and having a cutting device and a tool for cutting or similar processing (e.g. perforating, folding or creasing) of objects located on the working surface. The objects may represent, in particular, printed or unprinted sheets of paper, cardboard or similar materials, foams, plastic films, cloths, fiber fabrics, leather or the like.

Many cutting machines feature a machine base body made of a fiber composite material, such as carbon fiber reinforced plastic (CFRP) or glass fiber reinforced plastic (GFRP), with moving parts guided along linear guides made of steel or aluminum. This combination of fiber composite material and metal is problematic, particularly in the case of the crossbeam, in that the coefficient of linear expansion of fiber composites—at least in the longitudinal direction of the fibers—is typically lower or significantly lower than that of the metal guide rails when the majority of these fibers are oriented in the longitudinal direction of the crossbeam.

This adversely causes the so-called bimetallic effect, in which two materials with different coefficients of expansion elongate to different extents when heated and shorten to different extents when cooled. Therefore, when the temperature of one or both components of the beam changes relative to the temperature that prevailed during assembly, an undesirable curvature of the beam occurs.

This problem is countered in the prior art, for example, by mitigating the different thermal expansion of the two materials by design. In DE 10 2004 047525 A1, the guide rail is mounted in an axially floating manner and fixed with segmented clamping elements which form a fixed anchor and at the same time allow axial expansion of the rail. Such a floating mounting of the linear guide in the longitudinal direction by means of rolling bearing with needle bearings is very costly and heavy and, moreover, cannot be scaled down to an arbitrarily small size, and is thus only available for particularly large machines. It would therefore be desirable to obtain a lighter and constructively simpler solution to the problem that can also be used for smaller machines.

Alternatively, the thermal behavior in all three spatial directions can in principle also be specifically influenced by the fiber orientation in the fiber-matrix composite, but this is only possible at the expense of stiffness. In a beam of the cutting machine, however, the majority of the carbon fibers are preferably oriented in the longitudinal direction of the beam in order to achieve the highest possible bending stiffness with as little fiber material as possible. As a result, however, the coefficient of thermal expansion of such a CFRP beam in the longitudinal direction is very close to zero. A specific fiber orientation in the CFRP machine base body leads either—when using the same amount of fibers—to a significant loss of stiffness (e.g. in terms of bending stiffness) or to a massive increase in weight to achieve the same stiffness values. It would therefore be desirable to obtain a solution to the problem in which a high stiffness can also be achieved with a low material input.

Temperature compensation is known in principle from the technical field of CNC machine tools. Thus, thermally initiated displacements on machine tools can be compensated by the NC control on the basis of the following procedures, among others:

1) Determination of temporal and local temperature changes on structural components of the machine by means of temperature sensors (e.g. on machine bed, column or headstock);
2) Determination of the changes in length of structural components of the machine tool using strain gauges; and
3) Use of other representative variables such as feed drive powers, motor power losses, coolant or room temperatures.

It would be desirable to obtain a solution to the problem in which such compensation can be achieved by simpler means, and by means adapted to the peculiarities of a cutting machine.

It is therefore an object of the invention to provide a cutting machine with improved temperature compensation functionality.

It is a further object of the invention to provide such a cutting machine in which the temperature compensation functionality is accomplished with little design effort and with little computational effort.

It is a further object of the invention to provide such a cutting machine in which a cutting path can be adapted in real time to changing temperatures.

At least one of these objects is solved by the realization of the characterizing features of the independent claims.

Advantageous designs of the invention can be found in the respective dependent claims.

A first aspect of the invention relates to a cutting machine, comprising
- a working surface configured to accommodate at least one object to be cut,
- a gantry travel system arranged above this working surface with a beam and a working group, and
- a computer unit with a processor with computing capacity and algorithms for controlling the cutting machine.

Here, the working group has a cutting device and is movable along at least one guide rail of the beam in a first direction. The beam is movable in a second direction, in particular wherein the first and second directions are orthogonal to each other. According to the invention, a plurality of temperature sensors are attached to the beam along the first direction, and the cutting machine has a temperature compensation functionality in which the computer unit is configured to receive temperature data from the temperature sensors in real time and use it to control the cutting machine.

According to one embodiment of the cutting machine according to the invention, the beam comprises a machine base body made of a first material, and the guide rail comprises a second material, wherein the first material and the second material have different coefficients of linear expansion.

In one embodiment, the first material is a plastic or a fiber composite, in particular a carbon fiber reinforced plastic (CFRP) or a glass fiber reinforced plastic (GFRP), and the second material is a metal, for example steel or aluminum.

In a further embodiment, the temperature sensors are mounted between the guide rail and the machine base body. In a particular embodiment, the guide rail is attached to the machine base body by means of screws, bolts or rivets, and the temperature sensors are attached to these screws, bolts or rivets.

According to one embodiment of the cutting machine according to the invention, a plurality of temperature sensors distributed over the transverse axis is provided, in particular at least four temperature sensors. By increasing the number of temperature sensors distributed over the transverse axis, the accuracy of the temperature compensation functionality can be advantageously increased.

According to a further embodiment of the cutting machine according to the invention, the temperature sensors are mounted on the guide rail.

In a particular embodiment, the temperature sensors are attached to the guide rail by means of screws, bolts or rivets. Optionally, the guide rail is attached to the machine base body by means of screws, bolts or rivets, and the temperature sensors are attached to these screws, bolts or rivets.

In a further embodiment, the working group is movable along two or more parallel guide rails in the first direction. In this case, the temperature sensors can be mounted either on only one or alternatively on several, i.e. at least two, or on all of the parallel guide rails.

According to a further embodiment of the cutting machine according to the invention, the control of the cutting machine comprises defining a cutting path of the cutting device and/or guiding the cutting device along a defined cutting path. The computer unit can then be designed in particular to use the temperature data to define the cutting path.

According to a further embodiment of the cutting machine according to the invention, the computer unit comprises a memory unit for storing jobs for cutting (or similarly processing) specific objects and is configured to define a cutting path for the cutting device according to at least one stored job and based on the temperature data of the temperature sensors.

In one embodiment, the computer unit is configured to use the temperature data to adjust a defined cutting path, particularly in real time.

In one embodiment, adjusting the cutting path is based on compensation values stored in a look-up table (LUT).

Using the temperature data can include, in particular, looking up the compensation values in the LUT based on the temperature data of the individual temperature sensors. Compensation values for different positions of the cutting device may be stored in the LUT. Furthermore, the compensation values may each comprise a value for adjusting the cutting path in the first direction and in the second direction.

According to a further embodiment of the cutting machine according to the invention, the computer unit is designed within the framework of the temperature compensation functionality to use temperature data for controlling the cutting machine only from those temperature sensors which are attached to the beam along the first direction, i.e. in particular to the guide rail or between the guide rail and the machine base body. In one embodiment, the cutting machine further does not have any other temperature sensors, i.e. none other than those mounted on the beam along the first direction, or on the guide rail or between the guide rail and the machine base body.

A second aspect of the invention relates to a method for controlling a cutting machine, in particular a cutting machine according to one of the preceding claims. The method may thereby be carried out as a computer-implemented method wholly or partly by or in the computer unit of the cutting machine, in particular fully automatically and without user intervention. The method comprises a retrieval of a cutting job for processing, e.g. cutting, an object on a working surface of the cutting machine with a tool inserted into a cutting device, a definition of a cutting path for the cutting device based on the cutting job, continuously retrieving position data of the cutting device from position sensors of a gantry travel system disposed above the working surface, wherein the position data include coordinates in at least a first direction and a second direction, and guiding, based on the position data, the cutting device in at least the first direction and the second direction along the cutting path for processing, e.g. cutting, the object.

According to the invention, the method comprises a temperature compensation functionality with a continuous retrieval of temperature data from one or more, for example at least four, temperature sensors, and a use of the temperature data for defining the cutting path and/or for adjusting the cutting path.

According to one embodiment of the method according to the invention, the temperature data are used to continuously adjust a defined cutting path in real time. In one embodiment, the temperature data are also used to define the cutting path.

According to a further embodiment, the method comprises a retrieval of compensation values from a LUT based on the temperature data of the individual temperature sensors. In this context, compensation values for different positions of the cutting device can be stored in the LUT. Furthermore, the compensation values can each comprise a value for adjusting the cutting path in the first direction and in the second direction.

A third aspect of the present invention relates to a computer program product comprising program code stored on a machine-readable medium for carrying out the method for operating a cutting machine, in particular wherein the program is carried out in a computer unit of the cutting machine of the first or second aspect of the invention.

The cutting machine according to the invention and the method according to the invention are described in more detail below by means of specific exemplary embodiments shown schematically in the drawings, purely by way of example, with further advantages of the invention also being discussed. The drawings show in detail.

Figure 1:
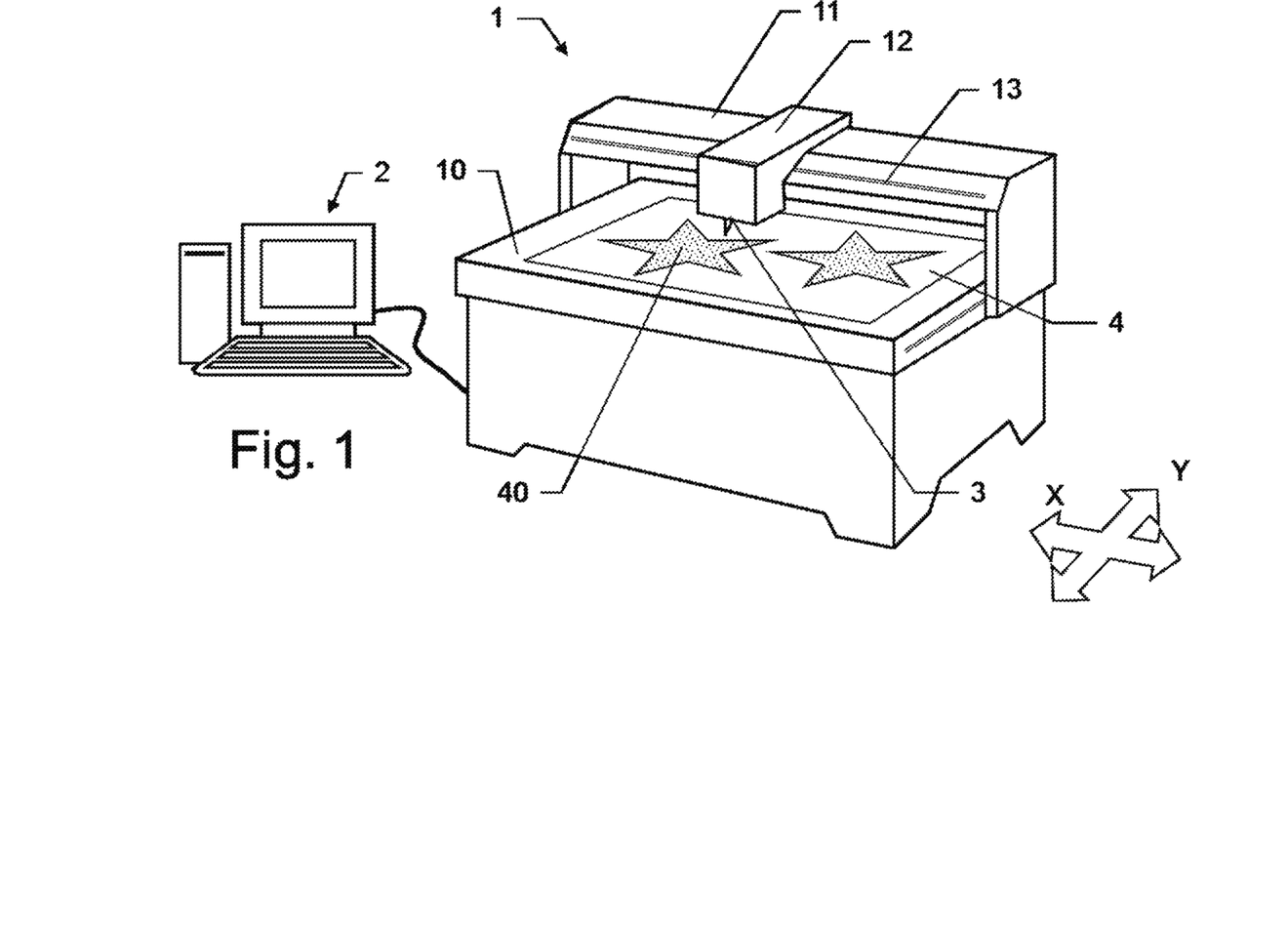
FIG. 1 shows an exemplary embodiment of a cutting machine according to the invention.

FIG. 1 shows a generic cutting machine 1 in portal design. As a flatbed cutting machine, it has a table with a flat working surface 10 on which an object 4 to be cut can be placed.

Above the working surface 10, a working group 12 is arranged having a cutting device 3 and a tool inserted therein, which is designed here as a cutting tool and has a blade for cutting the object 4. Optionally, the cutting tool or the blade may be automatically replaceable. Such a tool change functionality is described, for example, in EP 3 689 537 A1. The working group 12 is movable relative to the working surface 10 in at least two dimensions by means of a motor, in order to be able to approach any point of the working surface 10. For this purpose, the working group 12 is movably attached in a first direction X to a crossbeam 11, which in turn is movably attached in a second direction Y to the table. The beam 11 and the working group 12 together as a "beam assembly" form at least part of the gantry travel system of the machine 1. A linear positioning system with position markings along the longitudinal and transverse axes of the gantry travel system and corresponding position sensors on the beam 11 and on the working group 12 enables the current position of the working group 12 relative to the working surface to be determined in the first direction X and the second direction Y (not shown here). For example, incremental length measuring systems with electronic measurement value acquisition and with material or optical-based measurement embodiments can serve as length measuring systems for relative position determination of the axes.

The cutting machine 1 also has a computer unit 2. This can be designed as an external computer with a data connection to the machine 1, as shown here, or as an internal control unit integrated into the machine 1 itself. The cutting machine 1 can also have an additional control panel in which the computer unit 2 or parts thereof are integrated.

The computer unit 2 comprises a processor with computing capacity and algorithms for controlling the cutting machine 1 according to a provided cutting job. "Cutting" in this context does not necessarily mean complete severing, so that a "cutting job" can also include a job for perforating, folding or creasing the object or also for performing a similar work step which can be executed with a machine of the type and a corresponding tool in the cutting device 3. The computer unit 2 also has a data memory for storing the cutting jobs and optionally other data.

The computer unit 2 is configured to control the cutting device 3 and, optionally, a camera (not shown here), in particular to move the working group 12 relative to the working surface 10. Such a camera of the cutting device may, for example, be provided at the working group 12 and, in particular, be configured to detect patterns 40 on the object 4 in order to ensure more accurate positioning of the cutting tool 3 relative to the object 4. This is described, for example, in WO 2018/184677 A1.

To provide the mobility of the working group 12 along the beam 11, the latter has at least one guide rail 13, for example made of steel or another metal with similar properties. The guide rail is designed in particular as a profiled rail and in one piece (monolithic). The body of the beam 11 ("machine base body") is otherwise mainly made of a carbon fiber reinforced plastic (CFRP) or a similar material, in particular with a coefficient of linear expansion (in the longitudinal direction of the beam) that is similarly low to that of CFRP. The CFRP material of the beam 11 differs significantly from the steel of the guide rail 13 in terms of its coefficient of linear expansion. In particular, the coefficient of linear expansion of the CFRP material—at least in the longitudinal direction of the beam—is typically significantly lower than that of the steel guide rails 13. As a result, an undesirable curvature of the beam 11 can occur when the temperature changes, which adversely changes a position of the cutting tool 3 relative to the object 4 without this being detectable by the positioning system. This can result in a faulty cutting result.

Figure 2:
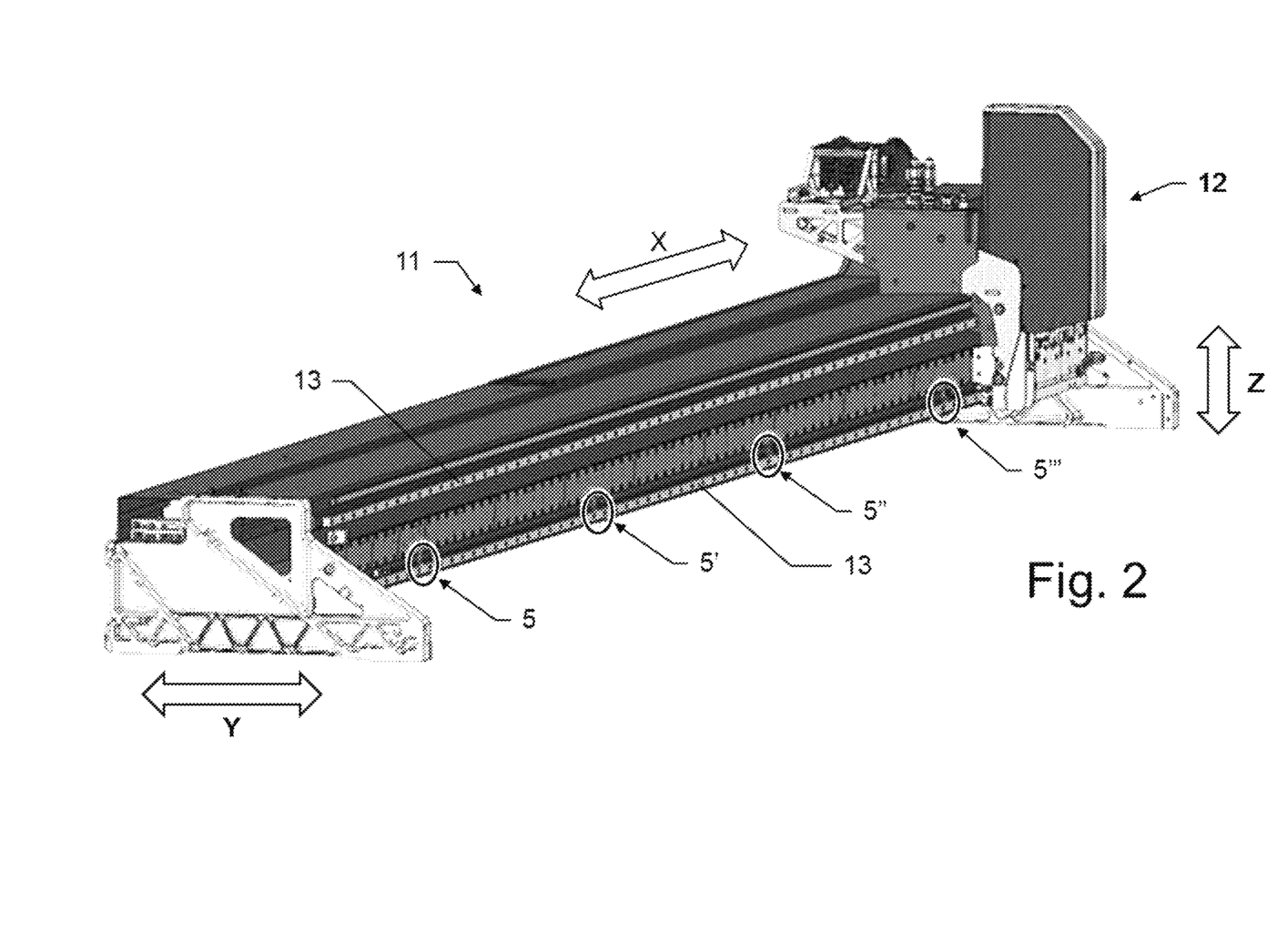
FIG. 2 shows a beam of the cutting machine with a guide rail and temperature sensors attached to it.

FIG. 2 shows an exemplary embodiment of the transverse beam 11 with two parallel, horizontal guide rails 13, 13', along which the working group 12 is mounted so as to be movable in the first direction X. According to the invention, one or more temperature sensors 5, 5', 5", 5'" are provided on the beam 11, with these temperature sensors being distributed along the first direction over the beam. In the embodiment shown here, four temperature sensors 5, 5', 5", 5'" are attached to a first guide rail 13, but more or fewer temperature sensors can also be provided. In this case, the accuracy of a temperature compensation functionality of the machine can be increased by increasing the number of temperature sensors distributed along the transverse axis.

The gantry travel system of the machine features the beam assembly consisting of the beam 11 and the working group 12 with the cutting tool, which is movably attached to the beam 11. To provide a linear feed axis of the working group 12, a linear guide with guide rails 13, 13' made of metal, in particular steel, is mounted on a machine base body of the beam 11 made of plastic, e.g. a carbon fiber reinforced plastic (CFRP). Both external, environmentally induced temperature influences, e.g. a change in room temperature or solar radiation, and internal, operationally induced temperature influences, e.g. motor heat loss or frictional heat of the linear guides, can lead to a relevant displacement of the feed axis due to strongly different coefficients of linear expansion of the two materials (so-called bimetallic effect).

CFRP consists of carbon fibers embedded in a matrix of synthetic resin. Here, the mechanical properties of the cured composite benefit primarily from the tensile strength and stiffness of the carbon fibers. The matrix prevents the fibers from shifting against each other under load. In particular, the CFRP machine base body of the beam 11 can have a laminate structure, as a result of which it undergoes virtually no length changes in the longitudinal direction during temperature changes. This means that in principle all add-on components with thermal linear expansion coefficients not equal to zero can be regarded as disturbance variables. In this constellation, the steel guide rails 13, 13', which are designed as profiled rails, are the components with the greatest influence on the thermal behavior of the feed axis, since they generate by far the greatest thermal forces during temperature changes due to their material and cross-section, as well as their continuous length (mounted in one piece). Possible further add-on components (e.g. secondary parts of a linear motor) provide only a relatively minor—and therefore mostly negligible—contribution to the total displacement due to their cross-section and their design in non-continuous segment pieces. Therefore, significant compensation of the axis displacement can be achieved by measuring the guide rail temperature alone. The thermally initiated displacements of the linear feed axis in the CFRP-steel composite can therefore advantageously be compensated exclusively by recording the temperature of the disturbance variable. For this purpose, the temperature of the disturbance variable is measured at several points along the feed axis by the temperature sensors 5, 5', 5", 5'" and the position is corrected by the NC control by means of previously stored compensation values. The combination of the CFRP base body of the beam 11 with the steel guide rails 13, 13' results in a specific thermal behavior for the overall system that is dependent on the stiffness values and the coefficients of linear expansion of the two different components. The specific thermal behavior of the overall system can be determined in advance by measurements and/or simulations, and the necessary position correction values can be determined from this and stored in a memory of the cutting machine, or the computer unit.

By detecting the guide rail temperature at several points along the travel path of the working group 12, it is also possible to detect localized temperature changes which occur, for example, as a result of direct sunlight or as a result of an irregular, e.g. localized, travel movement of the axis. A higher number of temperature sensors 5, 5', 5", 5'" and a targeted distribution of the sensors along the transverse axis depending on the respective machine can in principle lead to a more precise detectability of the temperature distribution.

Alternatively, a profiled rail guide with profiled rails made of a material other than steel is also possible, in particular with aluminum profiled rails. In these, the basic profile of the profiled rail can be made of an aluminum alloy, and the raceways of the rolling elements can be small inserted (usually pressed-in) profiles made of steel. Typically, such profiled rail guides made of aluminum alloys are used primarily in applications with low loads, with low requirements for precision and/or with high requirements for low masses, e.g. in the areas of handling technology, assembly technology, conveyor technology, light machine construction and basically also in cutting machines—either as main guides or as additional, supporting guides. The bimetallic effect and the undesirable consequences thereof also occur with aluminum profiled rails in combination with the CFRP beam.

Figure 3A:
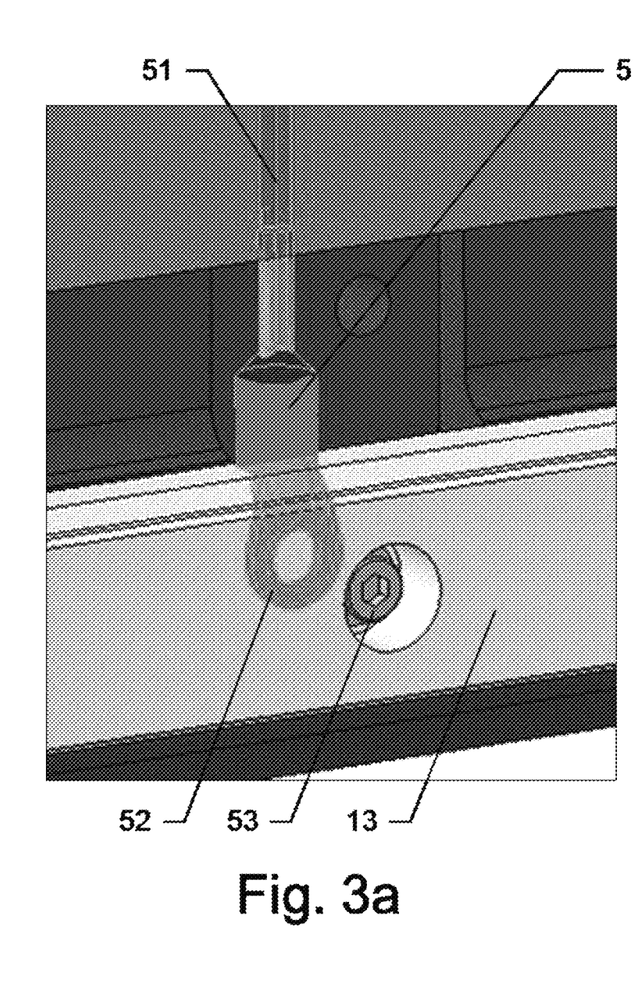
FIGS. 3a-b show a temperature sensor attached to the guide rail.
Figure 3B:
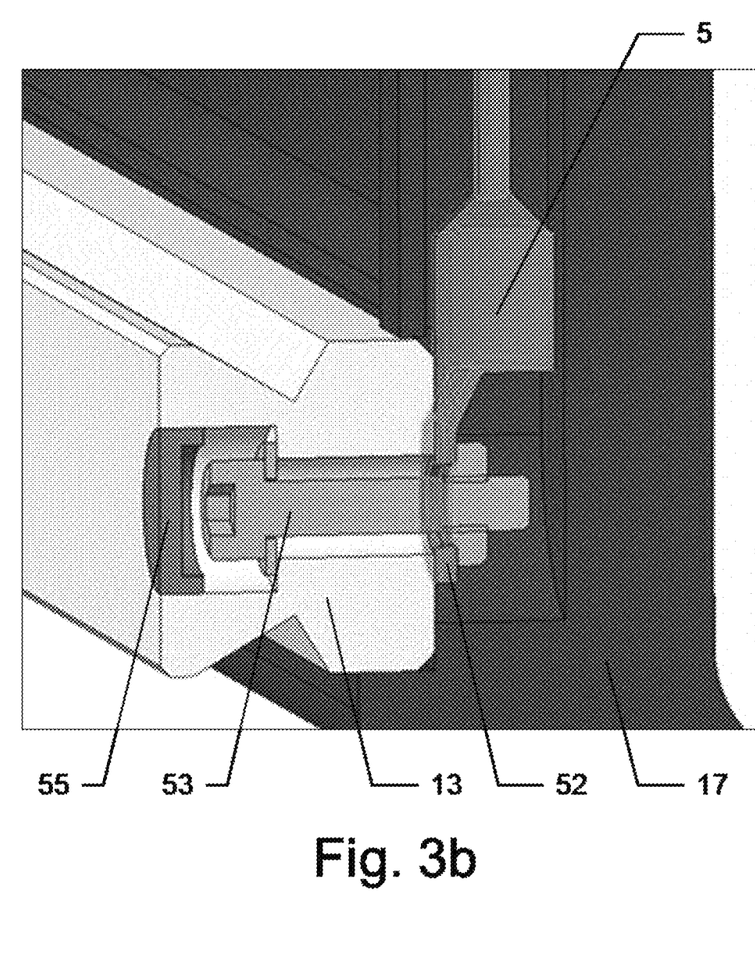

FIGS. 3a and 3b show a detailed view of an exemplary temperature sensor 5, which is mounted behind a guide rail 13 in order to detect a temperature of the guide rail 13 at this point. FIG. 3a shows an external view of the guide rail 13 with the temperature sensor 5 mounted behind it, and FIG. 3b shows a cross-section.

Via a cable 51, the temperature sensor 5 can be supplied with electricity on the one hand, and temperature data with information about measured temperatures can be sent to the computer unit of the cutting machine on the other hand.

The temperature sensor 5 has an annular washer 52 which is designed to be attached to screw 53 in such a way that it always contacts the guide rail 13 and ensures a stationary attachment of the temperature sensor 5. Screw 53 may be provided with a cover 55 on the outside. If the guide rail 13 is screwed onto the machine base body 17 made of CFRP, the temperature sensor 5 can also be attached in the same way to a screw 53 fastening the guide rail 13 to the machine base body 17. Instead of the screw 53 shown here, other fastening means can also be used, e.g. bolts or riveted joints, to which the temperature sensor 5 can be attached.

Figure 4:
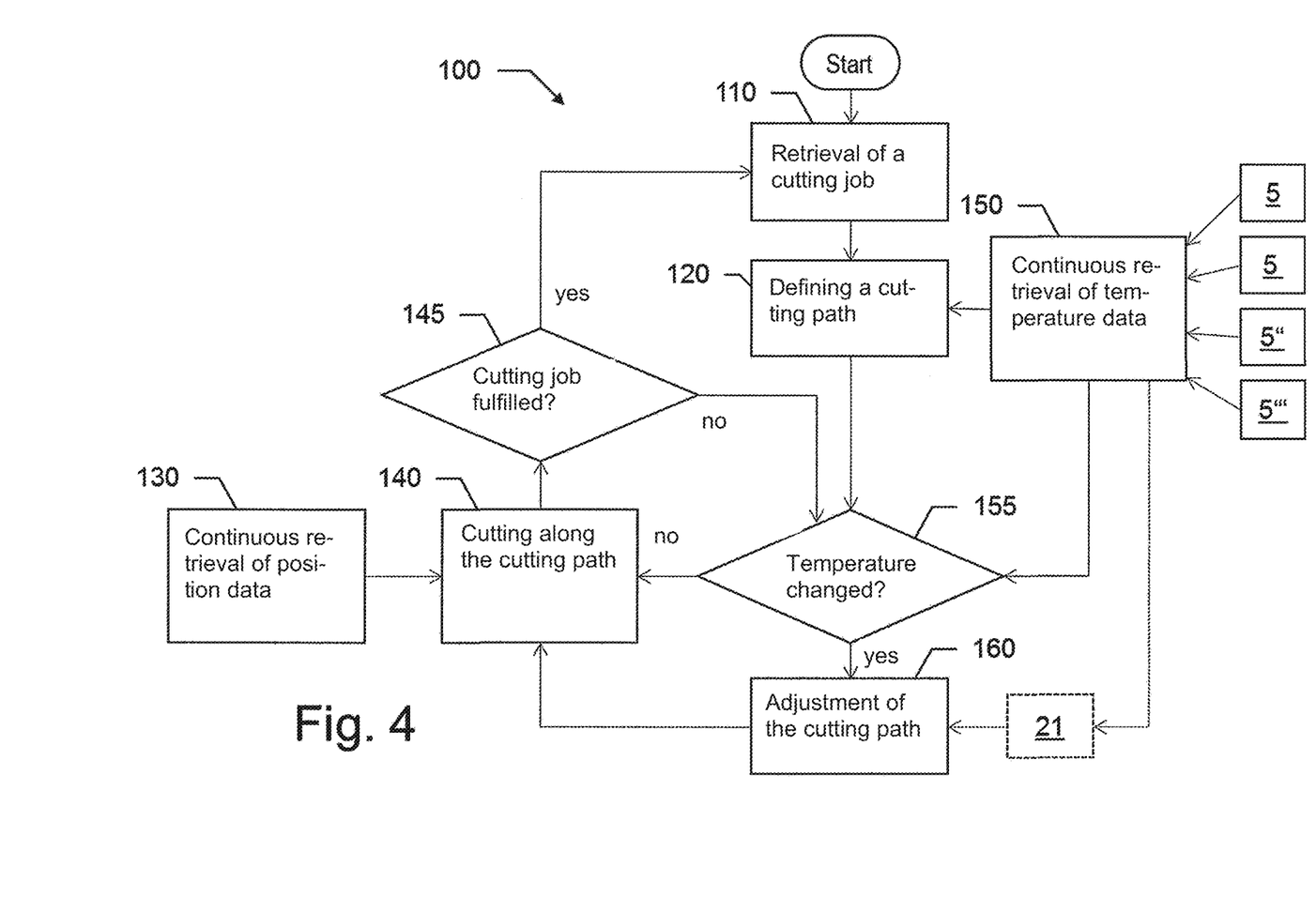
FIG. 4 shows a flowchart illustrating an exemplary embodiment of a method according to the invention for controlling a cutting machine.

FIG. 4 shows a flowchart illustrating an exemplary embodiment of a method 100 according to the invention for controlling a cutting machine.

It is known from the prior art to call up a cutting job or other processing job stored in a memory of the machine (instead of cutting, a similar work step, such as perforating, folding or creasing the object can also be ordered) 110, and to define a cutting path (or processing path) for the tool, e.g. knife, based on this 120. Current position data is continuously retrieved from position sensors of the machine 130, for example a gantry travel system arranged above a working surface of the machine with a beam and a working group, as shown in FIG. 1. Based on this position data, the tool is guided along the defined cutting path and can thus perform the processing of the object instructed in the cutting job, in particular a cutting 140 of the object.

According to the invention, in addition to the above-mentioned steps 110, 120, 130, 140 of the method 100, temperature data are continuously retrieved from a temperature sensor, or in particular from a plurality of temperature sensors 5, 5', 5", 5'", e.g. at least four temperature sensors 5, 5', 5", 5'", which are distributed on a guide rail of the beam as shown in FIG. 2, 150 and are automatically used by a computer unit to control the cutting machine.

In the purely exemplary method shown in FIG. 4, the temperature data are used for defining 120 of the cutting path. For this purpose, the temperature distribution prevailing at the time of defining 120 is determined. To compensate for any bending of machine components, in particular the beam, caused by this temperature distribution, the coordinates of the cutting path are adjusted accordingly.

Additionally, in the method 100 illustrated herein, a continuous check 155 is performed to determine whether the temperature distribution has changed to any relevant extent. If not, the defined cutting path continues to be traversed to cut 140 (or otherwise process) the object according to the cutting job. If, on the other hand, the temperature distribution has changed to a relevant extent, the cutting path can be adjusted accordingly in real time 160, so that from then on the tool continues to follow the cutting path thus adjusted in order to cut 140 (or otherwise process) the object according to the cutting order. This continuous checking 155 of the temperature change and, optionally, adjustment 160 of the cutting path may be repeated until the cutting job is completed 145, after which, with the retrieval 110 of a new cutting job, the method 100 may be repeated for that new cutting job.

A large number of possible temperature distributions can be stored in a look-up table 21 (LUT). Thus, for each possible combination of temperature values of each of the existing temperature sensors, a corresponding correction value can be specified. For example, the temperature values stored in the LUT can each specify a temperature in tenths of a degree Celsius increments. Optionally, a plurality of correction values can be specified for each temperature distribution for a plurality of possible positions or position ranges of the tool, for example if a bending of the beam due to a certain temperature distribution has a stronger effect on the cutting result in one range than in another range. The LUT 21 can, for example, be stored in a memory unit of the computer unit of the cutting machine.

Alternatively, one or more mathematical formulas can be stored in order to calculate the compensation value from the temperature distribution by the computer unit. Optionally, a large number of formulas can be stored for a large number of possible positions or position ranges of the tool.

When checking 155 whether the temperature distribution has changed to a relevant extent, it can be checked, for example, whether one or more of the temperature values obtained have exceeded a predefined limit value. Alternatively or additionally, it can also be checked whether a resulting curvature of the bar has relevant effects, for example whether a position deviation of the tool exceeds a predefined limit value at one or more points, wherein this limit value can optionally also depend on an accuracy requirement of the cutting job.

It is understood that these figures shown are only schematic illustrations of possible exemplary embodiments. The various approaches can also be combined with each other and with prior art devices or methods.

The invention claimed is:

1. A cutting machine comprising:
   a working surface configured to accommodate at least one object to be cut, wherein the object comprises at least one of sheets of paper, cardboard, foams, plastic films, cloths, fiber fabrics, or leather;

a gantry travel system arranged above the working surface and comprising a beam and a working group; and a computer unit comprising a processor for controlling the cutting machine, wherein:

the working group comprises the cutting device and is movable along at least one guide rail of the beam in a first direction, the beam is movable in a second direction, wherein the beam comprises a machine base body made of a first material, and the guide rail is made of a second material, wherein the first material and the second material have different coefficients of linear expansion, one or more temperature sensors are attached to the beam along the first direction, wherein the one or more temperature sensors are mounted between the guide rail and the machine base body, wherein the guide rail is fastened to the machine base body by fasteners, and the temperature sensors are attached to the fasteners, and the computer unit is designed to receive temperature data from the temperature sensors in real time.

2. The cutting machine according to claim 1, wherein the first material is a plastic or a fiber composite, and the second material is a metal.

3. The cutting machine according to claim 1, wherein at least four temperature sensors are attached to the beam along the first direction.

4. The cutting machine according to claim 1, wherein the temperature sensors are attached to the guide rail.

5. The cutting machine according to claim 1, wherein:

the computer unit is designed, within a framework of the temperature compensation functionality, to use temperature data only from those temperature sensors which are attached to the beam along the first direction, to the guide rail or between the guide rail and a machine base body, for controlling the cutting machine; and/or the cutting machine does not have any temperature sensors other than those temperature sensors which are mounted on the beam along the first direction.

6. The cutting machine according to claim 1, wherein the first direction and the second direction orthogonal to each other.

7. A cutting machine comprising:

a working surface configured to accommodate at least one object to be cut;

a gantry travel system arranged above the working surface and comprising a beam and a working group; and a computer unit comprising a processor for controlling the cutting machine, wherein:

the working group comprises a cutting device and is movable along at least one guide rail of the beam in a first direction, the beam is movable in a second direction, the beam comprises a machine base body made of a first material, the guide rail is made of a second material, wherein the first material and the second material have different coefficients of linear expansion, one or more temperature sensors are attached to the beam along the first direction, the one or more temperature sensors are mounted between the guide rail and the machine base body, wherein the guide rail is fastened to the machine base body by fasteners, and the temperature sensors are attached to the fasteners, and the computer unit is designed to receive temperature data from the temperature sensors in real time and to use them for controlling to control the cutting machine.

8. The cutting machine according to claim 7, wherein the first direction and the second direction orthogonal to each other.

* * * * *